United States Patent [19]
Bäbler

[11] Patent Number: 6,090,196
[45] Date of Patent: Jul. 18, 2000

[54] BETA QUINACRIDONE PIGMENT

[75] Inventor: Fridolin Bäbler, Hockessin, Del.

[73] Assignee: Ciba Specialty Chemicals Corporation, Tarrytown, N.Y.

[21] Appl. No.: 09/065,958

[22] Filed: Apr. 24, 1998

Related U.S. Application Data

[60] Provisional application No. 60/044,812, Apr. 25, 1997.

[51] Int. Cl.[7] .................. C09B 48/00; C07D 471/06
[52] U.S. Cl. ............ 106/497; 546/49; 546/56; 546/57; 106/495
[58] Field of Search .................. 106/497, 495; 546/49, 56, 57

[56] References Cited

U.S. PATENT DOCUMENTS

| | | | |
|---|---|---|---|
| 2,821,529 | 1/1958 | Struve | 260/279 |
| 2,844,485 | 7/1958 | Struve | 106/288 |
| 4,857,646 | 8/1989 | Jaffe | 546/49 |
| 5,093,497 | 3/1992 | Schutze et al. | 546/56 |
| 5,229,515 | 7/1993 | Pfenninger et al. | 546/49 |
| 5,281,269 | 1/1994 | Ganci et al. | 106/497 |
| 5,286,863 | 2/1994 | Bäbler et al. | 546/56 |
| 5,424,429 | 6/1995 | Hendi et al. | 546/49 |
| 5,502,192 | 3/1996 | Ganci | 546/49 |
| 5,518,539 | 5/1996 | Hao et al. | 106/495 |
| 5,591,258 | 1/1997 | Urban et al. | 106/497 |
| 5,755,874 | 5/1998 | Urban et al. | 106/497 |
| 5,840,901 | 11/1998 | Babler | 546/49 |

FOREIGN PATENT DOCUMENTS

| | | |
|---|---|---|
| 3834748 | 4/1988 | Germany. |
| 1297705 | 11/1972 | United Kingdom. |

*Primary Examiner*—Anthony Green
*Attorney, Agent, or Firm*—David R. Crichton

[57] ABSTRACT

A new beta quinacridone pigment characterized by masstone and tint reflection spectra, and a process for its preparation is disclosed. The new beta quinacridone pigment is especially useful for coloring coating compositions, such as automotive paints, and plastics. Also disclosed is a new pigment composition consisting of the inventive beta quinacridone pigment and a carbazole dioxazine pigment.

29 Claims, 2 Drawing Sheets

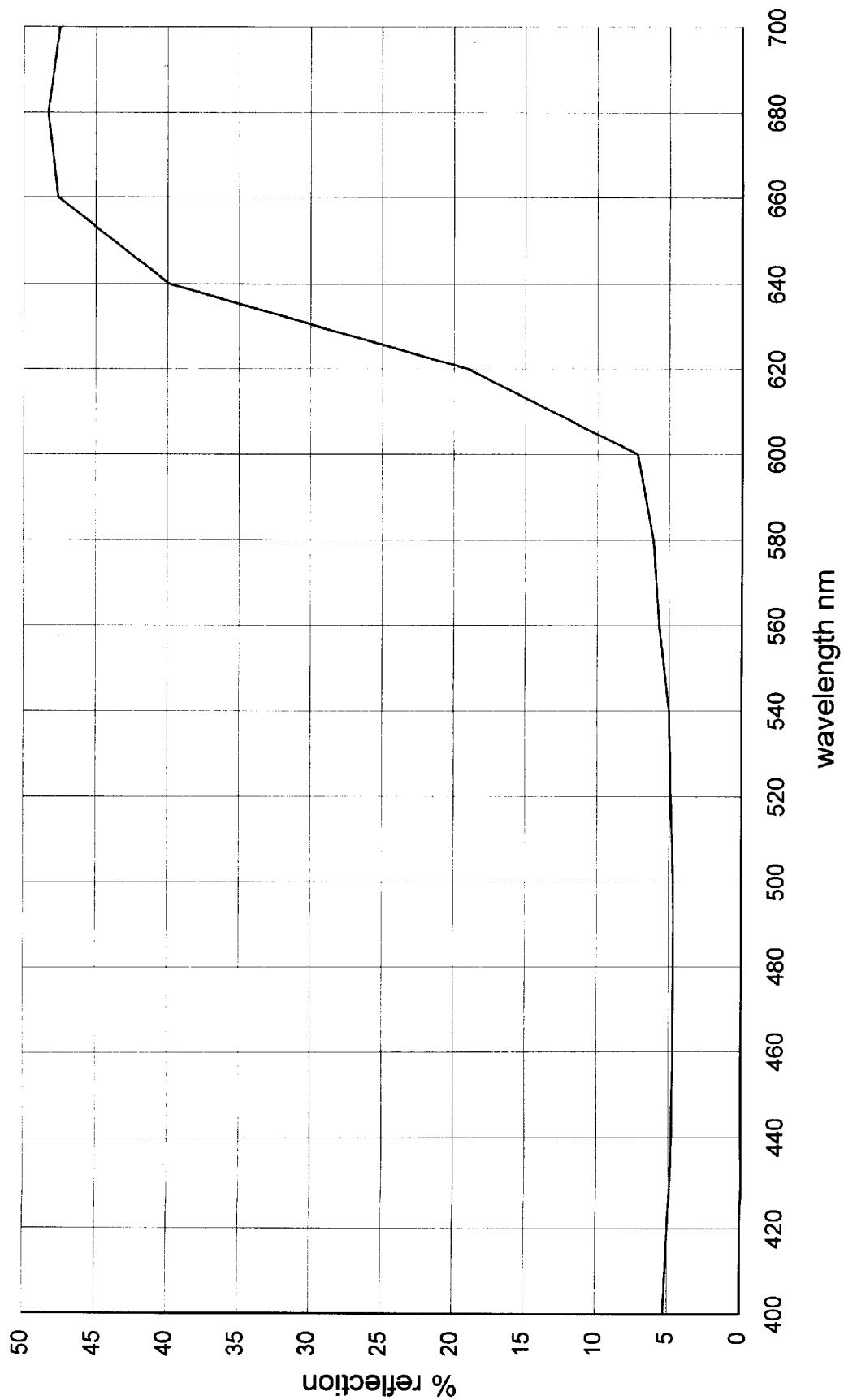

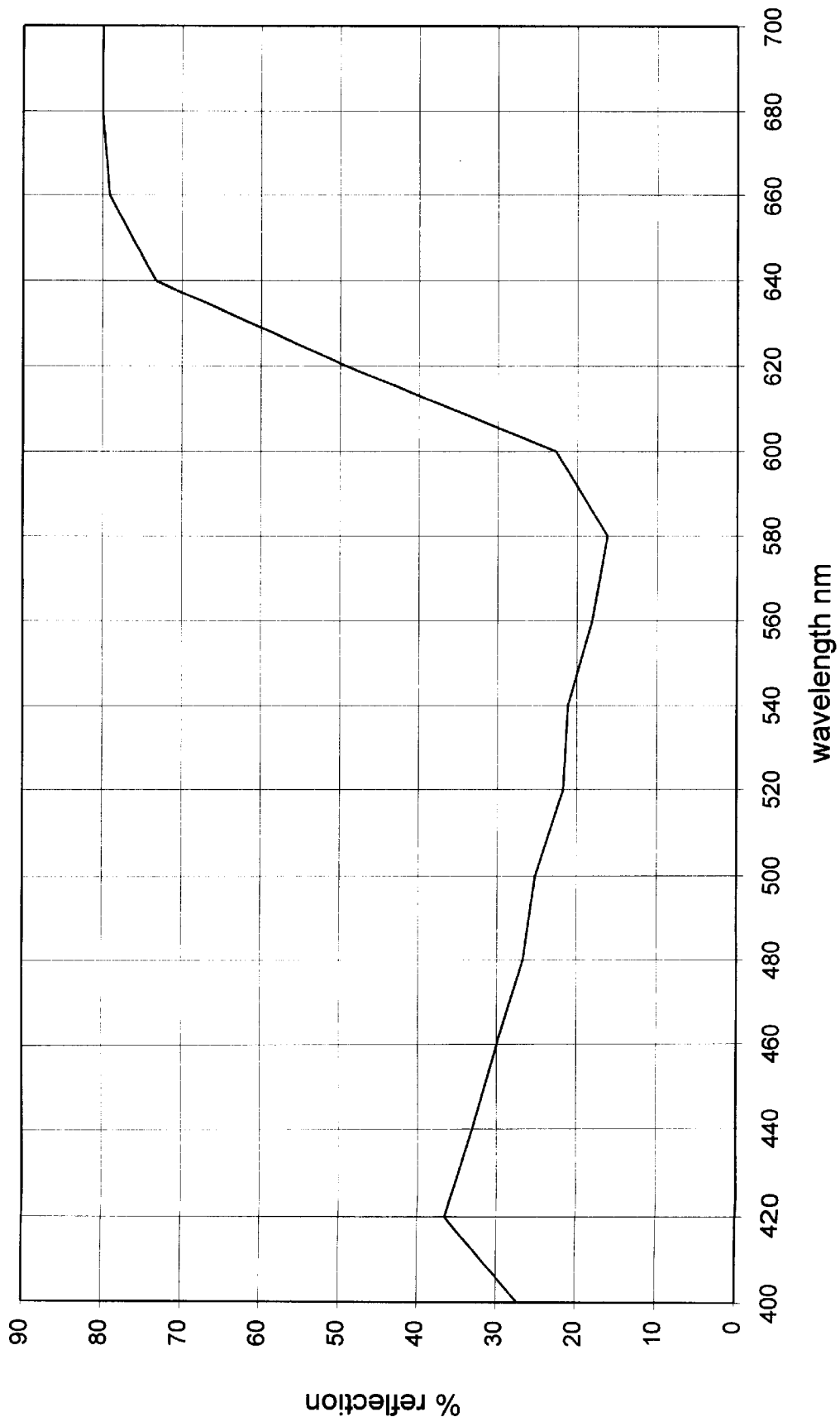

BETA QUINACRIDONE PIGMENT

This application claims the benefit under 35 USC 119(e) of U.S. Provisional Application Ser. No. 60/044,812, filed Apr. 25, 1997.

SUMMARY

The present invention relates to quinacridone pigments, in particular to a novel form of a beta quinacridone pigment having unique color characteristics, its preparation and its use as a pigment in high molecular weight organic materials.

BACKGROUND

Quinacridone, also referred to as 5,12-dihydroquino[2,3-b]acridine-7,14-dione, is a well-known pigment having the formula I

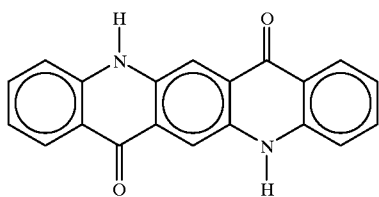

Quinacridone is known to exist in three major polymorphic modifications. The alpha form, which is disclosed in U.S. Pat. No. 2,844,484, and the gamma forms which are disclosed in the U.S. Pat. Nos. 2,844,581; 2,969,366; 3,074,950 and 5,233,624 respectively, are red, while the beta form is a violet pigment.

Several patents describe various forms of beta quinacridone pigments. For example U.S. Pat. Nos. 4,857,646; 5,229,515 and 5,281,269 describe a beta-I form which is distinguished from the previously known beta-II form described in U.S. Pat. No. 2,844,485 by its X-ray-diffraction pattern and color characteristics. The beta-I form is characterized by its opaque magenta color versus the transparent violet quinacridone pigments of the beta-II form. Both forms are commercially available.

The present invention relates to a novel beta quinacridone pigment having unique and surprising color characteristics. In particular, the inventive pigment is characterized by its masstone and tint reflection spectra from 400 to 700 nm, its x-ray-diffraction pattern, which is a beta form; its specific surface area, which is typically in the range of $17\pm4$ $m^2/g$, and its primary pigment particle size, which is generally in the range of 0.1 to 3 $\mu m$.

The inventive pigment shows, depending on its application media, its pigmenting concentration and other co-applied pigments, a unique color. Particularly interesting color shades are generated by applying the pigment together with effect pigments such as pearlescent mica or metallic pigments. Such shades show a strong unique color flop from a violet to a red. This is very surprising since the masstone of the pigment itself has a brownish-bronze appearance. Due to the outstanding fastness properties, its excellent rheological properties and unique color characteristics, it is highly suited for use in plastics and coatings applications, particularly in automotive coating systems.

BRIEF DESCRIPTION OF THE DRAWINGS

FIG. 1 depicts the reflection spectrum of the inventive quinacridone pigment measured on a sprayed masstone coloration obtained according to Example 3A.

FIG. 2 depicts the reflection spectrum of the inventive quinacridone pigment measured on a sprayed 10/90 tint coloration obtained according to Example 3B.

DETAILED DESCRIPTION

The present invention relates to a novel beta quinacridone pigment which is characterized by a 10/90 tint reflection spectrum at complete hide, which is measured from 400 to 700 nm, having a peak at 420 $nm\pm10$ nm, a negative slope from 420 nm to 580 nm, a positive slope from 580 to 660 nm followed by a shoulder from 660 to 700 nm, and wherein the reflection at 420 nm is about 46%, and at 580 nm about 21% of the reflection at 660 nm. This negative slope from 420 nm to 560 nm generally shows a 5 to 35% higher reflection versus known commercial beta quinacridone violets. This is shown in FIG. 2.

The inventive pigment is further characterized by a masstone reflection spectrum from 400 to 700 nm displaying a minimum at $480\pm10$ nm with only a slight negative slope from 400 to 480 nm and a slight positive slope from 480 to 600 nm, a very strong positive slope from 600 to 660 nm followed by a shoulder from 660 to 700 nm, and wherein the reflection at 480 nm is around 10% of the reflection at 660 nm. This is shown in FIG. 1.

In order to measure the reflection spectrum, the inventive pigment is first incorporated into a substrate, for example a basecoat/clearcoat paint system such as those described in Examples 3A and 3B. It is the reflection spectrum of the pigmented substrate such as the coated panel or a pigmented plastic sheet which is then measured. The reflection spectra are measured at "complete hide", which means that the substrate is pigmented to such an extent that any background color is not observable. At "complete hide" it is not possible to see the background color of a coated panel or the background color through a pigmented plastic sheet.

The overall shape of the reflection spectra are characteristic of the inventive pigment regardless of the substrate into which the pigment is incorporated. However, the percent reflectance at any particular wavelength will vary depending on the substrate.

Appropriate substrates include lacquers, inks, coating compositions, and plastics. Especially appropriate coating compositions include the basecoat/clearcoat systems conventionally used in the automotive industry. Especially appropriate plastics include the polyvinyl halides, especially polyvinyl chloride, and the polyolefins, for example low or linear low density or high density polyethylene and polypropylene.

The expression "10/90 tint" is a commonly used expression in the pigments industry and is intended to have its usual meaning: that the substrate is pigmented by the inventive pigment in combination with titanium dioxide in a ratio of about 10 to 90. Thus, the 10/90 tint reflection spectrum is the reflection spectrum of the substrate pigmented by the inventive beta quinacridone pigment in combination with titanium dioxide in a ratio of about 10:90.

A masstone reflectance spectrum is the reflectance spectrum observed when the inventive pigment is the only pigment used to color the substrate.

Basecoat/clearcoat coating systems, such as those used in the automotive industry, are important substrates for the inventive pigment. When incorporated into a basecoat/clearcoat paint system to complete hide, the inventive beta quinacridone pigment yields a masstone coated panel that is characterized by a reflection spectrum having a reflection at 400 nm of above 5 percent, a minimum below 4.9 percent at 480±10 nm, a reflection at 560 nm±10 nm above 5 percent, and a reflection at 660±10 nm and at 700 nm each above 40 percent, and a 10/90 tint coated panel characterized by a reflection spectrum having a reflection at 400 nm of above 25 percent, a peak of above 35 percent at 420 nm±10 nm, a reflection at 580 nm±10 nm of above 14 percent, and a reflection at 660 nm±10 nm of above 70 percent followed by a reflection at 700 nm of above 70 percent. In particular, the masstone reflection spectrum shows a reflection at 400 nm of from 5.0 to 5.4 percent, a reflection at 480 nm of from 4.4 to 4.9 percent, a reflection at 560 nm of above 5.2 percent, in particular from 5.2 to 6.2 percent, a reflection at 660 nm of above 41 percent, in particular from 41 to 50 percent and a reflection at 700 nm of from 41 to 50 percent, and the 10/90 tint reflection spectrum shows a reflection at 400 nm of above 25 percent, in particular from 25 to 30 percent, a maximum at 420 nm of above 35 percent, in particular above 36.5 percent, a reflection at 580 nm of above 14.5 percent, a reflection at 660 nm of above 70 percent, in particular from 70 to 82 percent, and a reflection at 700 nm of above 70 percent, in particular from 70 to 85 percent.

The coated panel which is used to obtain the masstone reflection spectrum described above is prepared according to present Example 3A and the 10/90 tint panel used to obtain the tint reflection spectrum is prepared according to present Example 3B.

In general, at least 50 percent of the particles in the inventive pigment have a primary pigment particle size in the range of from 0.1 μm to 3 μm as shown by an electron micrograph.

The inventive pigment shows a specific surface area of 17±4 $m^2$/g, preferably 17±3 $m^2$/g as determined by the BET method, and the x-ray diffraction pattern of a beta quinacridone, as described in Example 1.

The inventive pigment can be prepared by any method capable of producing the beta form of a quinacridone pigment, provided that the above-described pigment properties and color characteristics are obtained. In a preferred method the inventive beta quinacridone pigment is prepared by a direct pigmentary process wherein 6,13-dihydroquinacridone is oxidized in an alcoholic basic aqueous reaction medium with an aromatic nitro compound or an aqueous hydrogen peroxide solution as the oxidant, advantageously in the presence of a pigment derivative such as a diketopyrrolopyrrole derivative or preferably a quinacridone derivative, as particle growth and crystal phase director. Such processes are for example described in U.S. Pat. No. 5,424,429 or copending Application Ser. No. 08/910,167.

The quinacridone derivative is preferably phthalimidomethylquinacridone, quinacridone sulfonic acid and its salts, for example the aluminum salt, and imidazolyl- or pyrazolylmethylquinacridone. The quinacridone derivative is added before, during or after the 6,13-dihydroquinacridone salt formation. Preferably, it is added prior to the 6,13-dihydroquinacridone salt formation in an amount of 0.05 to 4 percent, most preferably 0.1 to 3 percent based on the 6,13-dihydroquinacridone.

To obtain the instant beta quinacridone pigment, it is however necessary to carefully select particular combinations of reagents, the concentration of which may vary only within a certain narrow range. If one or more other reagents are used, or they are used in different quantities, then either gamma quinacridones or known beta quinacridones are formed, which do not have the instant reflectivity.

Hence, a preferred process for the preparation of the instant beta quinacridone pigment of the present invention comprises oxidation of 6,13-dihydroquinacridone with a m-nitrobenzene sulfonic acid salt in the presence of a particle growth inhibitor and a base in a liquid phase, wherein the particle growth inhibitor is from 1.1 to 1.3 parts by weight of quinacridone monosulfonic acid or an equivalent amount of a salt thereof, based on 100 parts by weight of 6,13-dihydroquinacridone.

Salts of quinacridone monosulfonic acid are for example the metal salts, particularly the sodium, potassium, calcium and aluminum salts, preferably the aluminum salt.

The appropriate amount of m-nitrobenzene sulfonic acid sodium salt is from 43 to 75 parts by weight, preferably from 55 to 65 parts by weight, based on 100 parts by weight of 6,13-dihydroquinacridone.

The base is conveniently an alkali hydroxide, preferably sodium or potassium hydroxide, most preferably sodium hydroxide. The amount of base should be at least sufficient to convert 6,13-dihydroquinacridone and m-nitrobenzene sulfonic acid (if not added as a salt) to their alkali metal salts.

The present invention relates also to a process for the preparation of the instant beta quinacridone pigment through oxidation of 6,13-dihydroquinacridone with hydrogen peroxide in the presence of a catalyst, a particle growth inhibitor and a base in a liquid phase, wherein the catalyst is from 0.9 to 1.7 parts by weight of anthraquinone-2-sulfonic acid or an equivalent amount of a salt thereof, based on 100 parts by weight of 6,13-dihydroquinacridone, and the particle growth inhibitor is from 0.2 to 1.2 parts by weight, preferably from 0.5 to 0.9 parts by weight, of pyrazolylmethylquinacridone, based on 100 parts by weight of 6,13-dihydroquinacridone.

The base is conveniently an alkali hydroxide, preferably sodium or potassium hydroxide, most preferably sodium hydroxide. The amount of base should be at least sufficient to convert 6,13-dihydroquinacridone and anthraquinone-2-sulfonic acid to their alkali metal salts.

The appropriate amount of hydrogen peroxide is at least 1 mole per mole of 6,13-dihydroquinacridone. There is no upper limit for the amount of hydrogen peroxide, as the excess decomposes in the reaction mixture. However, an excessive amount of hydrogen peroxide can lead to the formation of impurities. Furthermore, it is not economical and may be dangerous to use hydrogen peroxide in quantities above about 10 moles per mole of 6,13-dihydroquinacridone. The preferred range is from 1.1 to 5 moles of hydrogen peroxide per mole of 6,13-dihydroquinacridone, most preferably from 1.2 to 3.5 moles of hydrogen peroxide per mole of 6,13-dihydroquinacridone. The hydrogen peroxide is preferably added to the reaction mixture in the form of a 5 to 30% by weight aqueous solution.

In either preparation method, the liquid phase is preferably a mixture of 50 to 750 parts by weight of a $C_1$–$C_4$alkanol and 20 to 750 parts by weight of water, based on 100 parts by weight of 6,13-dihydroquinacridone. Most preferably, the liquid phase is a mixture of 100 to 600 parts by weight of a $C_1$–$C_4$alkanol and 40 to 600 parts by weight of water, based on 100 parts by weight of 6,13-dihydroquinacridone. The $C_1$–$C_4$alkanol is preferably methanol.

The inventive beta quinacridone pigment shows unique color characteristics, particularly in the presence of an effect pigment such as titanium dioxide-coated mica or aluminum, when incorporated into a paint system, especially a basecoat/clearcoat paint system. Panels spray painted with such paint systems exhibit unique flop effects, i.e. they change color from a violet to a red depending on the viewing angle. Thus, the present invention further relates to a beta quinacridone pigment which shows a brown masstone color, a violet tint and a reddish-violet effect color when applied in combination with effect pigments such as pearlescent mica; that is, it shows a down flop from a violet to a red in a basecoat/clearcoat coating.

Although the inventive pigment shows excellent dispersibility, outstanding Theological properties and a remarkably good flocculation resistance for a beta quinacridone pigment, in order to further improve the pigment properties of the inventive beta quinacridone pigment, texture-improving agents and/or anti-flocculants are optionally added before, during or after the corresponding preparatory process.

The texture-improving agent and/or anti-flocculant is preferably incorporated into the inventive beta quinacridone pigment in an amount of from 0.05 to 20 percent, most preferably 1 to 10 percent, by weight, based on the combined weights of the beta quinacridone pigment, texture-improving agent and/or anti-flocculant mixture.

Texture-improving agents are especially useful as an additional component which improves the properties of the inventive beta quinacridone pigment. Suitable texture-improving agents include fatty acids having at least 12 carbon atoms, and amides, esters or salts of fatty acids. Typical fatty acid derived texture-improving agents include fatty acids such as stearic acid or behenic acid, and fatty amines such as laurylamine and stearylamine. In addition, fatty alcohols or ethoxylated fatty alcohols, polyols such as aliphatic 1,2-diols or polyvinylalcohol and epoxidized soy bean oil, waxes, resin acids and resin acid salts are suitable texture-improving agents.

Anti-flocculants are known in the pigments industry and are, for example, pigment derivatives such as sulfonic acid or sulfonamide derivatives. Generally, antiflocculants which are derivatives of a pigment from pigment classes such as those described in U.S. Pat. Nos. 3,386,843; 4,310,359 and/or 4,692,189 are preferably utilized.

Moreover the dispersibility of the inventive beta quinacridone can be further improved by subjecting the dried pigment to an air-jet milling step.

Air-jet milling is known and is described for example in DE 2042626 and U.S. Pat. Nos. 3,856,215, 3,648,936, 3,595,486 and 3,550,868, which are here incorporated by reference. Air-jet mills such as the JET-O-MIZER® or MICRO-JET® are commercially available from Fluid Energy Processing and Equipment Company, Plumsteadville, Pa. 18949.

In general, air-jet milling reduces the particle size of those particles in a sample which are outside of the desired particle size range. Thus, the average particle size of an air-jet-milled pigment sample usually changes only slightly after the milling step, but the particle size distribution of the particles in the pigment sample is within a much narrower range.

Due to its outstanding chemical resistance, heat stability, weather and light stability, the inventive beta quinacridone pigment is highly suitable for the coloration of various substrates such as inorganic materials and in particular high molecular weight organic materials. Thus, the present invention relates to a method of coloring a high molecular weight organic material which comprises incorporating an effective pigmenting amount of the inventive pigment into the high molecular weight organic material and to a composition comprising a high molecular weight organic material and an effective pigmenting amount of the inventive beta quinacridone pigment.

An effective pigmenting amount is any amount suitable to provide the desired color in the high molecular weight organic material. In particular, the inventive beta quinacridone pigment is used in an amount of 0.01 to 30% by weight, preferably 0.1 to 10% by weight, based on the weight of the high molecular weight organic material to be pigmented.

The pigmented, high molecular weight organic materials which are colored with the inventive pigment are useful in a variety of applications. For example, the inventive pigment is useful for the pigmentation of lacquers, inks, enamel coating compositions and thermoplastic or thermoset polymers.

The high molecular weight organic materials which are colored with the inventive pigment are, for example, cellulose ethers, cellulose esters, polyurethanes, polyesters, polycarbonates, polyolefins, polystyrene, polysulfones, polyamides, polycycloamides, polyimides, polyethers, polyether ketones, polyvinyl halides, polytetrafluoroethylene, acrylic and methacrylic polymers, rubber, silicone polymers, phenol/formaldehyde resins, melamine, formaldehyde resins, urea/formaldehyde resins, epoxy resins and diene rubbers or copolymers thereof.

High molecular weight organic materials which are useful for heat-curable coatings or cross-linked, chemically-reactive coatings, are also colored with the inventive pigment. The pigmented, high molecular weight organic materials prepared according to the present invention are especially useful in stoving finishes which contain customary binders and which are reactive at high temperature. These stoving finishes can be obtained from solvent or aqueous or powder paint systems known in the art. Examples of pigmented, high molecular weight organic materials which are used in coatings include acrylic, alkyd, epoxy, phenolic, melamine, urea, polyester, polyurethane, blocked isocyanate, benzoguanamine or cellulose ester resins, or combinations thereof. The pigmented, high molecular weight organic materials prepared according to the present invention are also useful as air-drying or physically-drying coatings.

The inventive beta quinacridone pigment is particularly suitable for preparing coatings conventionally employed in the automobile industry, especially in acrylic/-melamine resin, alkyd/melamine resin or thermoplastic acrylic resin systems, as well as in aqueous based coating systems.

Coatings and ink systems colored with the inventive beta quinacridone pigment possess excellent heat, light and weather fastness, as well as bleed and overspraying fastness properties.

The inventive beta quinacridone shows excellent dispersibility behavior. It can be easily dispersed in application media such as solvent- or aqueous-based paint dispersions, for example by conventional dispersion methods such as dispersion in a bead mill. Due to its relatively large pigment particle size, the inventive beta quinacridone, in particular the air-jet milled pigment, can also be applied in paint and ink systems directly as a "stir-in" pigment; thus avoiding the costly and time consuming dispersion step in a bead mill. Uniform distribution of the pigment particles throughout the entire application medium is readily achieved. Additionally, since paint dispersions containing the new beta quinacridone pigment show outstanding Theological behavior, the beta quinacridone pigment of this invention can be incorporated into an aqueous or solvent-based paint system at high concentrations.

The inventive beta quinacridone pigment shows excellent pigment properties and is applied alone or in the presence of other pigments or dyes in multicoat, such as basecoat/ clearcoat, as well as monocoat automotive or industrial paint and ink systems. The paints show a unique appearance. For example, unique styling effects are achieved when the inventive pigment is incorporated in conjunction with effect pigments such as graphite, layered light interference pigments, polymeric holographic pigments, liquid crystal interference pigments or, preferably, aluminum or titanium dioxide or iron oxide coated mica pigments.

Particularly interesting shades are achieved using the new beta quinacridone in mixture with a violet dioxazine pigment such as carbazole dioxazine. Thus, the present invention further relates to a pigment composition consisting of from 2 to 15, preferably 3 to 9 parts by weight of a carbazole dioxazine pigment and from 85 to 98, preferably 91 to 97 parts by weight of the inventive beta quinacridone pigment.

The carbazole dioxazine pigment is preferably a small particle size conditioned C.I. Pigment Violet 23, of the formula II

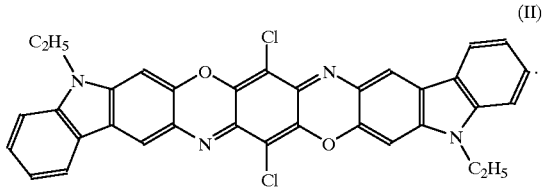

Any blending method can be applied which provides a homogeneous mixture of the inventive carbazole dioxazine/ beta quinacridone pigment composition. For example the new pigment composition can be obtained by adding the carbazole dioxazine to the beta quinacridone pigment slurry at the end step of the synthesis of the beta quinacridone, before the isolation by filtration and drying, or by wet blending the aqueous pigment presscakes, or preferably by dry blending the dry pigments.

Surprisingly, the inventive carbazole dioxazine/beta quinacridone pigment compositions show a very opaque maroon masstone color and a highly saturated, very strong bluish tinting color when dispersed in high molecular weight materials. Moreover, the inventive pigment compositions show outstanding pigment properties with respect to light, heat and weather stability.

It is known that the pigment saturation can depend on the pigment concentration when applied in a plastic material. It was found that the inventive pigment compositions manifest a high saturation even when incorporated at a concentration below 0.5%, advantageously at a concentration of 0.05 to 0.3% based on the plastic material.

Due to their excellent light stability, high color strength and unique bluish tinting color, the inventive pigment compositions are ideally suited for use as a shading component when applied together with other pigments. In view of their characteristic bluish undertone, the inventive pigment compositions are particularly useful in a variety of applications such as for the pigmentation of plastics, inks or paints.

Although the inventive carbazole dioxazine/beta quinacridone pigment compositions show excellent pigment properties, their performance can be further improved by the addition of specific additives and treating agents by processes such as those described for example in U.S. Pat. No. 5,453,151.

Particularly interesting additives include, for example, quinacridone derivatives such as phthalimidomethylquinacridone, imidazolyl- or pyrazolylmethylquinacridone, or diketopyrrolopyrrole derivatives such as the para- or meta-cyano derivative of 1,4-diketo-3,6-diphenyl pyrrolo[3,4-c]pyrrole. Use of phthalimidomethylquinacridone, imidazolyl- or pyrazolyl-methylquinacridone is especially preferred. These additives are preferably used in an amount of from 1 to 8 percent by weight based on the inventive carbazole dioxazine/beta quinacridone pigment composition.

These inventive pigment compositions are useful for pigmenting inks, paints and thermoplastic or thermoset polymers. They are particularly useful for pigmenting thermoplastics; for example polyolefins such as polypropylene and high, low or linear low density polyethylene, polyvinythalides such as polyvinylchloride and thermoplastic elastomer (TPE) resins and copolymers thereof in films, fibers, or molded articles.

The following examples illustrate various embodiments of the invention, but the scope of the invention is not limited thereto. In the examples, all parts are by weight unless otherwise indicated. The x-ray diffraction patterns are measured on a RIGAKU GEIGERFLEX diffractometer, type D/MaxII v BX. The coloristic data are obtained utilizing a CS-5 CHROMA SENSOR spectrophotometer.

EXAMPLE 1

A three liter flask equipped with a thermometer, stirrer and condenser is charged with 200 grams 6,13-dihydroquinacridone, 2.4 grams quinacridone monosulfonic acid aluminum salt and 1000 ml methanol. The mixture is stirred at a temperature of about 20 to 28° C. and 264 grams of 50% aqueous sodium hydroxide solution are added, followed by stirring at 50–55° C. for one hour. 120 grams m-nitrobenzene sulfonic acid sodium salt are dissolved in 133 grams of hot water and added to the above basic 6,13-dihydroquinacridone-methanol mixture, which is then heated to reflux and stirred at reflux for 2 hours.

One hundred ml cold water are added. The pigment suspension is then stirred for 5 to 10 minutes without heating and filtered. The presscake is washed with hot water to a pH of 8.0 to 8.5, then dried, yielding a quinacridone pigment with a specific surface area of 17 m²/g. The electron micrograph shows aggregated particles of 0.2 to 6 μm, which consist of primary pigment particles having a flaky, platelet shape and a size in the range of 0.1 to 3 μm.

The quinacridone pigment shows the characteristic x-ray diffraction pattern of a beta quinacridone, as shown by the following data:

| scattering angle °2θ | relative intensity % |
|---|---|
| 5.86 | 100 |
| 11.75 | 52 |
| 15.95 | 7 |
| 22.01 | 5 |
| 23.66 | 10 |
| 27.13 | 13 |
| 29.72 | 5 |

When incorporated into paints and plastics, the pigment shows a brownish masstone and a violet tinting color with excellent pigment properties.

EXAMPLE 2

A one liter flask equipped with a thermometer, stirrer and condenser is charged with 40 grams 6,13- dihydroquinacridone, 0.3 grams pyrazolylmethylquinacridone, 250 ml methanol and 52.8 grams 50% aqueous sodium hydroxide. The mixture is stirred under a slow flow of nitrogen at 50–55° C. for one hour, generating 6,13-dihydroquinacridone disodium salt. 0.6 grams anthraquinone-2-sulfonic acid sodium salt are added and the mixture is heated to reflux temperature. 73.5 grams of an aqueous 16.9% hydrogen peroxide solution are added into the reaction mixture with a peristaltic pump at a rate of 0.4 ml/minute maintaining reflux under a slow nitrogen flow over 2 hours and 35 minutes. The resulting pigment suspension is further stirred for 1 hour at reflux; then filtered. The presscake is washed with hot water and then dried, yielding 38.9 grams beta quinacridone pigment. This product shows similar good pigment properties and similar color characteristics to the beta quinacridone obtained following the procedure of Example 1.

EXAMPLE 3

This Example illustrates the incorporation of the inventive beta quinacridone prepared according to Example 1 into an automotive paint system.
Millbase formulation A pint jar is charged with 66 grams acrylic resin, 14.5 grams AB dispersant consisting of 45% of an acrylic resin in toluene, and 58.1 grams solvent (SOLVESSO 100 from American Chemical). 26.4 grams beta quinacridone obtained according to Example 1 and 980 grams of 4 mm diameter steel diagonal rods are added. The mixture is milled in the jar for 64 hours on a roller mill. The millbase contains 16.0% pigment with a pigment/binder ratio of 0.5 and a total non-volatile content of 48.0%

EXAMPLE 3A

Masstone Color 47.3 grams of the above millbase, 36.4 grams of a clear 47.8% solids unpigmented resin solvent solution containing a melamine resin catalyst, a nonaqueous dispersion resin and a UV absorber, and 16.3 grams of a clear unpigmented 58% solids unpigmented polyester urethane resin solvent solution, are mixed and diluted with a solvent mixture comprising 76 parts xylene, 21 parts butanol and 3 parts methanol to a spray viscosity of 20–22 seconds as measured by a #2 Fisher Cup.

The resin/pigment dispersion is sprayed onto a panel twice at 1½ minute intervals as basecoat. After 2 minutes, the clearcoat resin is sprayed twice at 1½ minute intervals onto the basecoat. The sprayed panel is then flashed with air in a flash cabinet for 10 minutes and then "baked" in an oven at 265° F. (129° C.) for 30 minutes, yielding a reddish-brown colored panel. The coated panel has excellent weatherability.

The following color characteristic data are measured.
Masstone Reflection Measurement Data:

| wavelength nm | reflection % | wavelength nm | reflection % | wavelength nm | reflection % |
|---|---|---|---|---|---|
| 400 | 5.3 | 500 | 4.7 | 600 | 7.2 |
| 420 | 5.0 | 520 | 4.9 | 620 | 19.0 |
| 440 | 4.8 | 540 | 5.0 | 640 | 39.9 |
| 460 | 4.7 | 560 | 5.7 | 660 | 47.6 |
| 480 | 4.7 | 580 | 6.1 | 680 | 48.3 |
| 500 | 4.7 | 600 | 7.2 | 700 | 47.5 |

The above reflection data correspond to the following C.I.E. (1964) L*, a*, b*, C* and h color space value numbers, using a D65 illuminant and 10 degree observer with a specular component included:

L*=33.20; a*=28.09; b*=12.24; C*=30.64; h=23.54

EXAMPLE 3B

Tint Color
"white base"

A $TiO_2$ dispersion is prepared by mixing the following ingredients in a quart glass jar:

604.1 grams of a $TiO_2$ pigment, 129.8 grams of acrylourethane resin, and 161.1 grams of solvent (SOLVESSO 100).

1 pint of ½ inch ceramic balls are then added. The dispersion is then milled for 24 hours. The white pigment dispersion is separated from the balls, yielding a "$TiO_2$ dispersion" containing 67.5% pigment and with a total solids content of 77.4%.

A 10/90 tint shade paint is prepared by mixing the following ingredients:
15.7 grams "mill base", 33.4 grams "white base", 20.0 grams of a clear 47.8% solids unpigmented resin solvent solution containing a melamine resin catalyst, a nonaqueous dispersion resin and a UV absorber, and 30.9 grams of a clear unpigmented 58% solids unpigmented polyester urethane resin solvent solution. The paint contains 25.1% pigment with a pigment/binder ratio of 0.7 and a total nonvolatile content of 60.9%.

The pigment/$TiO_2$/resin dispersion is sprayed onto a panel followed by a clearcoat, following the procedure described in Example 3A, to yield a high gloss violet tinted panel with excellent weatherability.

The following color characteristic data were measured:
Tint Reflection Measurement Data:

| wavelength nm | reflection % | wavelength nm | reflection % | wavelength nm | reflection % |
|---|---|---|---|---|---|
| 400 | 27.2 | 500 | 25.2 | 600 | 22.7 |
| 420 | 36.5 | 520 | 21.7 | 620 | 49.2 |
| 440 | 33.1 | 540 | 21.1 | 640 | 73.3 |
| 460 | 30.0 | 560 | 18.1 | 660 | 79.1 |
| 480 | 26.7 | 580 | 16.2 | 680 | 80.0 |
| 500 | 25.2 | 600 | 22.7 | 700 | 80.0 |

The above reflection data correspond to the following C.I.E. (1964) L*, a*, b*, C* and h color space value numbers using a D65 illuminant and 10 degree observer with a specular component included:

L*=56.94; a*=24.71; b*=−9.79; C*=26.58; h=338.38.

EXAMPLE 3C

Mica Color
"mica dispersion"

The following ingredients are stirred together to provide a mica dispersion containing 27.9% pearlescent mica pigment and a total solids content of 69.1%:

251.1 grams of bright white mica, EXTERIOR MEARLIN from The Mearl Corp., 315.0 grams of nonaqueous dispersion (NAD) resin, and 180.0 grams of acrylourethane resin.

A 50/50 white mica shade coating is prepared by mixing the following ingredients:

29.9 grams "millbase dispersion"

17.1 grams "mica dispersion"

6.4 grams acrylourethane resin,
3.6 grams nonaqueous dispersion (NAD) resin
73.0 grams of a melamine resin The pigment/pearlescent mica/resin dispersion is sprayed onto a panel followed by a clearcoat as described in the masstone coating of Example 3A. A strong violet color effect coating with excellent weatherability is obtained. The violet coating shows a high gloss and an attractive reddish downflop. The pigment particles are homogeneously distributed in the coating system.

EXAMPLE 3D

Metallic Color
"metallic dispersion"

A quart can is charged with 405 grams 5245AR aluminum paste (Silberline), 315 grams nonaqueous dispersion (NAD) resin and 180 grams acrylourethane resin. The mixture is stirred for 1–2 hours until lump-free.

A 50/50 metallic shade coating is prepared by mixing the following ingredients:
  25.9 grams "millbase dispersion",
  14.8 grams "metallic dispersion",
  36.2 grams melamine resin, and
  23.1 grams polyester urethane resin The viscosity is reduced to 20–22 seconds as measured by a #2 Fisher Cup with a thinning solvent mixture of the following composition: 76 grams xylene, 21 grams butanol and 3 grams methanol.

The violet pigment/metallic/resin dispersion is sprayed onto a primed panel followed by a clear coat as described above in the 50/50 white mica shade coating, yielding a violet metallic color effect coating with an excellent weatherability. The violet coating shows a high gloss and attractive reddish downflop.

EXAMPLE 4

63.0 grams of polyvinyl chloride, 3.0 grams epoxidized soy bean oil, 2.0 grams of barium/cadmium heat stabilizer, 32.0 grams dioctyl phthalate and 1.0 gram of the beta quinacridone pigment prepared according to Example 1 or Example 2 are mixed together in a glass beaker using a stirring rod. The mixture is formed into a soft PVC sheet with a thickness of about 0.4 mm by rolling for 8 minutes on a two roll laboratory mill at a temperature of 160° C., a roller speed of 25 rpm and friction of 1:1.2, by constant folding, removal and feeding. The resulting soft PVC sheet is colored in an attractive brownish-red shade and has excellent fastness to heat, light and migration.

EXAMPLE 5

Five grams of the beta quinacridone pigment prepared according to Example 1 or Example 2, 2.65 grams CHIMASORB 944LD (hindered amine light stabilizer), 1.0 gram TINUVIN 328 (benzotriazole UV absorber) and 2.0 grams IRGANOX B-215 Blend (antioxidant), all available from Ciba Specialty Chemicals Corporation, are mixed together with 1000 grams of high density polyethylene at a speed of 175–200 rpm for 30 seconds after flux. The fluxed, pigmented resin is chopped up while warm and malleable, and then fed through a granulator. The resulting granules are molded on an injection molder with a 5 minute dwell time and a 30 second cycle time at a temperature of 204° C. (400° F.). Homogeneously colored chips which show a reddish-brown color and have excellent light stability are obtained.

EXAMPLE 6

1000 grams of polypropylene granules (DAPLEN PT-55® from Chemie Linz) and 10 grams of the beta quinacridone pigment obtained in Example 1 are thoroughly mixed in a mixing drum. The granules so obtained are melt spun at 260–285° C. to reddish filaments of good light fastness and textile fiber properties.

EXAMPLE 7

A 16 ounce jar is charged with 20 grams beta quinacridone obtained according to Example 1 and 1.0 gram of a conditioned carbazole dioxazine pigment (CROMOPHTAL Violet GT from Ciba Specialty Chemicals Corporation). The mixture is rolled on a jar roller mill for 2 hours, yielding 21 grams of a violet pigment composition which shows an opaque maroon masstone color and a saturated bluish-violet tinting color shade when applied in plastics, inks or paints.

EXAMPLE 8

The procedure of Example 7 is repeated using a mixture of 19.6 grams beta quinacridone pigment obtained according to Example 1 or Example 2, 0.9 grams phthalimidomethylquinacridone and 1.5 grams CROMOPHTAL Violet GT, yielding a violet pigment composition with excellent light and heat stability when applied in paints, plastics and inks. The product shows a high masstone opacity and a strong, saturated bluish-violet tinting color shade.

EXAMPLE 9

The procedure of Example 7 is repeated using a mixture of 19.4 grams beta quinacridone pigment obtained according to Example 1 or Example 2, 1.1 grams pyrazolylmethylquinacridone and 1.5 grams CROMOPHTAL Violet GT, yielding a violet pigment composition with similar good light and heat stability when applied in paints, plastics and inks. The product shows a high masstone opacity and a strong, saturated bluish-violet tinting color shade.

EXAMPLE 10

The procedure of Example 8 is repeated using a mixture of 19.6 grams beta quinacridone pigment obtained according to Example 1 or Example 2, 0.9 grams 1,4-diketo-3,6-di-(3-cyanophenyl) pyrrolo [3,4-c] pyrrole and 1.5 grams CROMOPHTAL Violet GT, yielding a violet pigment composition with similar good light and heat stability when applied in paints, plastics and inks. The product shows a high masstone opacity and a strong, saturated bluish-violet tinting color shade.

EXAMPLE 11A

Two grams of the pigment composition prepared according to Example 8, 18.0 grams $TiO_2$ pigment R-101 from DU PONT, 2.65 grams CHIMASORB 944LD (hindered amine light stabilizer), 1.0 gram TINUVIN 328 (benzotriazole UV absorber) and 2.0 grams IRGANOX B-215 Blend (antioxidant), are mixed together with 1000 grams of high density polyethylene at a speed of 175–200 rpm for 30 seconds after flux. The fluxed pigmented resin is chopped up while warm and malleable, and then fed through a granulator. The resulting granules are molded on an injection molder with a 5 minute dwell time and a 30 second cycle time at temperatures of 205° C., 260° C. and 315° C. Homogeneously colored chips which show a highly saturated strong violet tinting color are obtained at each of the molding temperatures, demonstrating the excellent heat stability of the pigment composition. Similar results are obtained if the pigment of Example 8 is replaced by the pigment compositions of Examples 9 or 10.

EXAMPLE 11B

The procedure of Example 11A is repeated using 5 grams of the pigment composition prepared according to Example 8, but without the $TiO_2$ pigment, yielding highly opaque maroon colored chips with similar color characteristics at each of the molding temperatures, demonstrating the excellent heat stability of the pigment composition.

EXAMPLE 12

500 grams of a beta quinacridone obtained according to Example 1 or 2 are air-jet milled such that the larger particles and aggregates are reduced and deaggregated to a particle size of below 4.0 pm on a MICRO-JET® air pulverizer from Fluid Energy Aljet, Plumsteadville, Pa. The resulting product shows an outstanding dispersibility and can be applied as a stir-in pigment in aqueous or solvent based paint and ink systems.

What is claimed is:

1. A process for the preparation of a beta quinacridone pigment having a 10/90 tint reflection spectrum at complete hide which is measured from 400 to 700 nm, having a peak at 420 nm±10 nm, a negative slope from 420 nm to 580 nm, a positive slope from 580 to 660 nm followed by a shoulder from 660 to 700 nm, and wherein the reflection at 420 nm is above 35%, and at 580 nm about 14% comprising oxidation of 6,13-dihydroquinacridone with a m-nitrobenzene sulfonic acid salt in the presence of a particle growth inhibitor and a base in a liquid phase, wherein the particle growth inhibitor is from 1.1 to 1.3 parts by weight of quinacridone monosulfonic acid or an equivalent amount of a salt thereof, based on 100 parts by weight of 6,13-dihydroquinacridone.

2. A process according to claim 1 wherein the beta quinacridone pigment has a reflection at 400 nm of above 25 percent, a peak of above 35 percent at 420 nm±10 nm, a reflection at 580 nm±10 nm of above 14 percent, and a reflection at 660 nm±10 nm of above 70 percent followed by a reflection at 700 nm of above 70 percent.

3. A process according to claim 2 wherein the beta quinacridone pigment has a reflection at 400 nm of from 25 to 30 percent, a maximum at 420 nm of above 36.5 percent, a reflection at 580 nm of above 14.5 percent, a reflection at 660 nm of from 70 to 82 percent, and a reflection at 700 nm of from 70 to 85 percent.

4. A process according to claim 1 wherein the beta quinacridone pigment has primary pigment particles, wherein at least 50 percent of the primary pigment particles have a particle size in the range from 0.1 to 3 micrometers as measured by an electron micrograph.

5. A process according to claim 4, wherein the primary pigment particles are largely in the shape of platelets.

6. A process according to claim 1 wherein the beta quinacridone pigment has a specific surface area of about 17±4 $m^2/g$.

7. A process according to claim 6 wherein the beta quinacridone pigment shows a color shift depending upon the viewing angle from violet to red when combined with a titanium dioxide coated mica or an aluminum effect pigment in a basecoat/clearcoat coating.

8. A composition comprising a high molecular weight organic material and an effective pigmenting amount of a beta quinacridone pigment made according to claim 1.

9. A composition comprising a high molecular weight organic material and an effective pigmenting amount of a beta quinacridone pigment made according to claim 1.

10. A composition according to claim 8, wherein said high molecular weight organic material is selected from the group consisting of cellulose ethers, cellulose esters, polyurethanes, polyesters, polycarbonates, polyolefins, polystyrene, polysulfones, polyamides, polycycloamides, polyimides, polyethers, polyether ketones, polyvinyl halides, polytetrafluoroethylene, acrylic and methacrylic polymers, rubber, silicone polymers, phenol/formaldehyde resins, melamine, formaldehyde resins, urea/-formaldehyde resins, epoxy resins and diene rubbers and copolymers thereof.

11. A composition according to claim 8, wherein said high molecular weight organic material is a plastic that is subsequently calendered, cast, molded or processed to fibers.

12. A composition according to claim 8, wherein said high molecular weight organic material is an industrial or automotive paint or ink coating.

13. A process for coloring a high molecular weight organic material, which comprises incorporating an effective pigmenting amount of the pigment made according to claim 1 into the high molecular weight organic material.

14. A pigment composition, comprising from 2 to 15 parts by weight of a carbazole dioxazine pigment and from 85 to 98 parts by weight of the beta quinacridone pigment made according to claim 1.

15. A pigment composition according to claim 14 consisting of from 3 to 9 parts by weight of a carbazole dioxazine pigment and from 91 to 97 parts by weight of the beta quinacridone pigment.

16. A pigment composition according to claim 14, wherein the carbazole dioxazine pigment is a conditioned pigment of the formula II

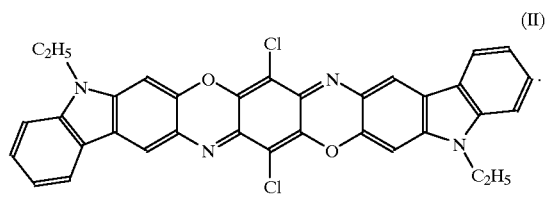

17. A pigment composition according to claim 14, which further comprises a quinacridone derivative and/or a diketopyrrolopyrrole derivative in an amount of from 1 to 8% by weight based on the pigment composition.

18. A pigment composition according to claim 17, wherein the quinacridone derivative is phthalimidomethylquinacridone, or imidazolyl- or pyrazolylmethylquinacridone.

19. A pigment composition according to claim 17, wherein the diketopyrrolopyrrole derivative is the para- or meta-cyano derivative of 1,4-diketo-3,6-diphenyl pyrrolo[3,4-c]-pyrrole.

20. A process of coloring a high molecular weight organic material, which comprises incorporating an effective pigmenting amount of the pigment composition of claim 14 into the high molecular weight organic material.

21. A process according to claim 20, wherein the pigment composition further comprises from 1 to 8% by weight based on the pigment composition of phthalimidomethylquinacridone, or imidazolyl-, or pyrazolylmethylquinacridone.

22. A process according to claim 21 wherein the high molecular weight material is a thermoplastic or thermoset polymer.

23. A process according to claim 22, wherein the thermoplastic high molecular weight material is polypropylene; low, linear low or high density polyethylene; polyvinyl chloride, a thermoplastic elastomer resin, or a copolymer thereof.

24. A process according to claim 20, wherein the high molecular weight material is an industrial or automotive paint or ink coating.

25. A process for the preparation of beta quinacridone pigment having a 10/90 tint reflection spectrum at complete hide which is measured from 400 to 700 nm, having a peak at 420 nm±10 nm, a negative slope from 420 nm to 580 nm, a positive slope from 580 to 660 nm followed by a shoulder from 660 to 700 nm, and wherein the reflection at 420 nm is above 35%, and at 580 nm about 14% comprising oxidation of 6,13-dihydro-quinacridone with hydrogen peroxide in the presence of a catalyst, a particle growth inhibitor and a base in a liquid phase, wherein the catalyst is from 0.9 to 1.7 parts by weight of anthraquinone-2-sulfonic acid or an equivalent amount of a salt thereof, based on 100 parts by weight of 6,13-dihydroquinacridone, and the particle growth inhibitor is from 0.2 to 1.2 parts by weight of pyrazolylmethylquinacridone, based on 100 parts by weight of 6,13-dihydroquinacridone.

26. A process for the preparation of a beta quinacridone pigment, which has a masstone reflection spectrum measured at complete hide between 400 to 700 nm having a minimum at 480±10 nm with a negative slope from 400 to 480 nm and a positive slope from 480 to 600 nm, a positive slope from 600 to 660 nm followed by a shoulder from 660 to 700 nm, and wherein the reflection at 480 nm is below 4.9% comprising oxidation of 6,13-dihydroquinacridone with a m-nitrobenzene sulfonic acid salt in the presence of a particle growth inhibitor and a base in a liquid phase, wherein the particle growth inhibitor is from 1.1 to 1.3 parts by weight of quinacridone monosulfonic acid or an equivalent amount of a salt thereof, based on 100 parts by weight of 6,13-dihydroquinacridone.

27. A process according to claim 26 wherein the beta quinacridone pigment has a masstone reflection spectrum having a reflection at 400 nm of above 5 percent, a minimum below 4.9 percent at 480±10 nm, a reflection at 560 nm±10 nm above 5 percent, and a reflection at 660±10 nm and at 700 nm each above 40 percent, the reflection spectrum being measured from a panel coated to complete hide with a basecoat/clearcoat paint system.

28. A process according to claim 27 wherein the beta quinacridone pigment has a reflection at 400 nm of from 5.0 to 5.4 percent, a reflection at 480 nm of from 4.4 to 4.9 percent, a reflection at 560 nm of from 5.2 to 6.2 percent, a reflection at 660 nm above 41 percent and a reflection at 700 nm of from 41 to 50 percent.

29. A process for the preparation of a beta quinacridone pigment, which has a masstone reflection spectrum measured at complete hide between 400 to 700 nm having a minimum at 480±10 nm with a negative slope from 400 to 480 nm and a positive slope from 480 to 600 nm, a positive slope from 600 to 660 nm followed by a shoulder from 660 to 700 nm, and wherein the reflection at 480 nm is below 4.9% comprising oxidation of 6,13-dihydroquinacridone with hydrogen peroxide in the presence of a catalyst, a particle growth inhibitor and a base in a liquid phase, wherein the catalyst is from 0.9 to 1.7 parts by weight of anthraquinone-2-sulfonic acid or an equivalent amount of a salt thereof, based on 100 parts by weight of 6,13-dihydroquinacridone, and the particle growth inhibitor is from 0.2 to 1.2 parts by weight of pyrazolylmethylquinacridone, based on 100 parts by weight of 6,13-dihydroquinacridone.

\* \* \* \* \*